T. L. Reed.
Lock-Coupling for Gas-Fixtures.
No. 73039   Patented Jan. 7, 1868.

Witnesses.
Isaac A. Brunell
D. K. Hoxsie

Inventor.
Thomas L. Reed.

United States Patent Office.

THOMAS L. REED, OF PROVIDENCE, RHODE ISLAND.

Letters Patent No. 73,039, dated January 7, 1868; antedated December 26, 1867.

IMPROVEMENT IN LOCK-COUPLING FOR GAS-FIXTURES.

*The Schedule referred to in these Letters Patent and making part of the same.*

TO ALL WHOM IT MAY CONCERN:

Be it known that I, THOMAS L. REED, of the city and county of Providence, and State of Rhode Island, have invented a new and improved Lock-Coupling for Connecting Flexible Tubing or Hose with Gas-Fixtures, and for other purposes; and I do hereby declare that the following is a full, clear, and exact description of the same, reference being had to the accompanying drawings making part of this specification, in which—

Similar letters indicate corresponding parts in all the figures.

Figure 1:
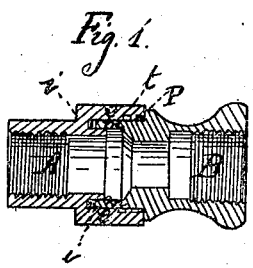
Figure 1 is a longitudinal section of my improved coupling, showing the two parts united.
Figure 2:
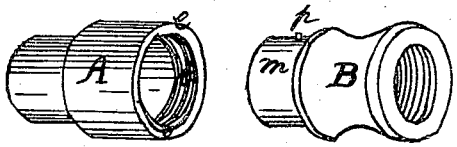
Figure 2 is a perspective view of the same, the two parts being unlocked and separated.

My coupling is in two pieces, A and B, each of which is provided with a screw-thread, cut inside, to screw the piece on the tubes or pipes which are to be coupled or united. The parts of the two pieces A and B, by which the union of the two is effected, consist of a male and a female sleeve, $m$ $e$, the male, $m$, fitting quite closely into the female, $e$, which also has upon the inside an annular groove to receive the packing-ring $i$, of the same diameter as the male sleeve $m$, and so arranged that when the male sleeve is inserted within the female sleeve, the end surface of the male will bear squarely against the packing, and when held thereon by any suitable means, a gas-fitting joint will be formed, while the two parts are held firmly together: And for the purpose of holding and pressing the two parts A B together, with the male sleeve in contact with the packing, as described, I cut a helical groove, $t$, or screw, on the inside of the female sleeve, as shown in fig. 2, and insert in the side of the male sleeve a peg or stud, $p$, and when the two parts are placed together, the male within the female, by turning the male sleeve the peg $q$ will enter the helical groove, and be the means of pressing the male part against the packing, and holding the two parts firmly in contact, and without liability of accidental disconnection.

Figure 3:
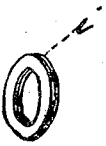
Figure 3 represents the packing used to form a joint in the said coupling.

As a suitable packing for the purpose, I have used successfully a ring of soft leather, calf-skin or roller-leather. But the better packing, and that which I prefer to use, is a ring, composed of a ring of leather and a ring of India rubber, cemented together, as shown in fig. 3, the India rubber being placed in the bottom of the annular packing-groove, with the leather side uppermost, and presented for the male sleeve to press against, and form the joint. It will be understood that a packing of this construction combines the elasticity of the rubber with the firmness of the leather, and that in this connection the parts, being constructed as described, the packing subserves two purposes, namely, first, to form a joint, and secondly, by its elasticity to press and bind the peg $p$ in the groove or screw-thread $t$ of the female sleeve, as to measurably and sufficiently prevent the two parts from unscrewing and becoming accidentally disconnected.

What I claim, and desire to secure by Letters Patent, is—

The coupling, constructed substantially as described, with a male and female sleeve, and an annular packing-cavity, and a helical groove, and a peg or stud, in combination, all as and for the purpose set forth.

I also claim the packing-ring, composed of India rubber and leather united together, substantially as described for the purpose specified.

THOMAS L. REED.

Witnesses:
ISAAC A. BROWNELL,
D. K. HOXSIE.